C. A. MacLELLAN.
VEHICLE CHECK.
APPLICATION FILED MAR. 6, 1917.
1,265,929.
Patented May 14, 1918.
2 SHEETS—SHEET 1.
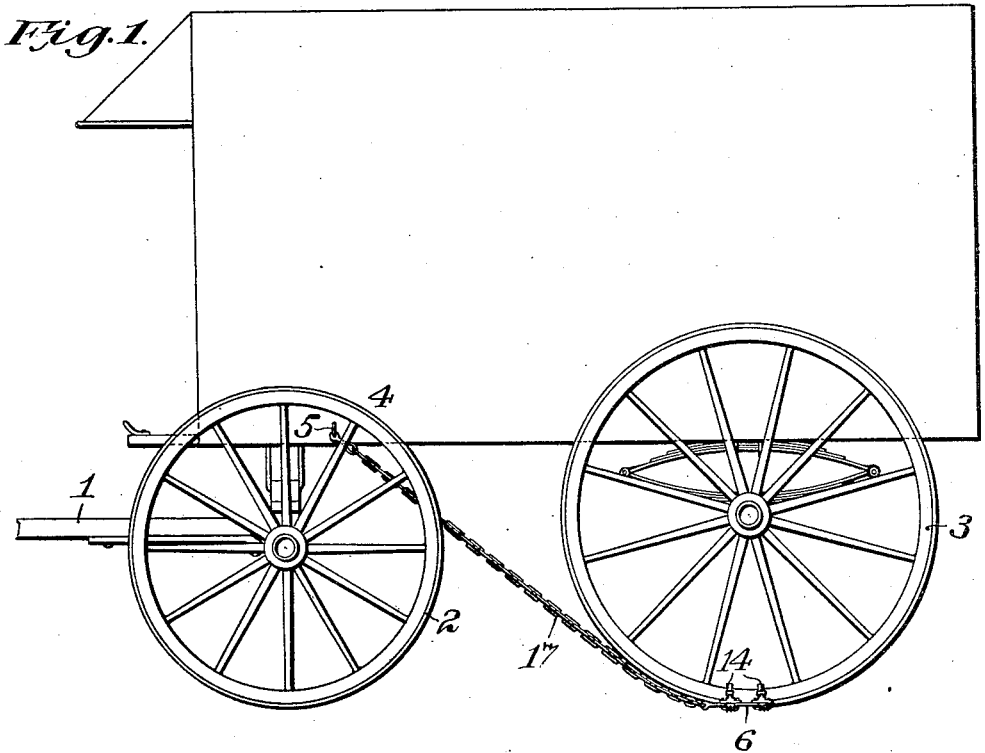
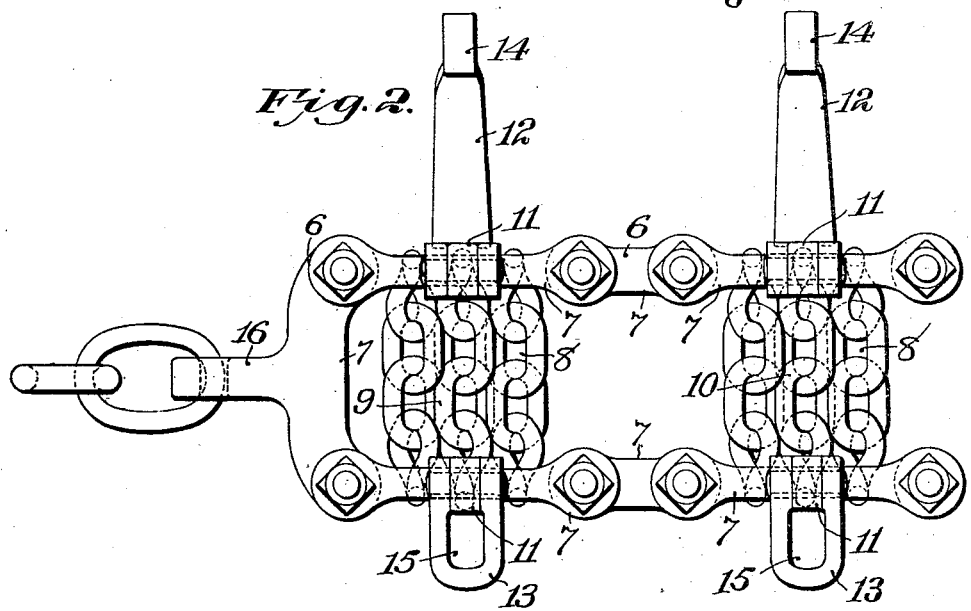
Inventor:
Charles A. MacLellan
by Jesse A. Holton
Atty C. A. MacLELLAN.
VEHICLE CHECK.
APPLICATION FILED MAR. 6, 1917.

1,265,929. Patented May 14, 1918.
2 SHEETS—SHEET 2.

Inventor:
Charles A. MacLellan
by Jesse A. Holt
Atty

UNITED STATES PATENT OFFICE.

CHARLES A. MacLELLAN, OF BOSTON, MASSACHUSETTS.

VEHICLE-CHECK.

1,265,929.	Specification of Letters Patent.	Patented May 14, 1918.

Application filed March 6, 1917.   Serial No. 152,673.

*To all whom it may concern:*

Be it known that I, CHARLES A. MACLELLAN, a citizen of the United States, and resident of Boston, in the county of Suffolk and State of Massachusetts, have invented certain new and useful Improvements in Vehicle-Checks, of which the following is a specification.

This invention relates to vehicle checks and with regard to certain more specific features thereof to clogs or retards which prevent slipping or skidding on slippery roads.

It is one of the objects of the invention to provide a device of the character above mentioned which shall be simple in construction, durable and inexpensive.

Another object is to provide reliably effective quick-attachable and detachable means for such a device.

Still another object comprises the provision of a yielding tread of a durable character which shall act to retard the movement of the vehicle but not to prevent same under the usual applied power.

Other objects will be in part obvious and in part particularly pointed out hereinafter.

The invention accordingly consists in the various features of construction, combination of elements, and arrangements of parts which will be exemplified by the construction hereinafter set forth and the scope of the application of which will be indicated by the following claims.

In the accompanying drawing wherein is shown one of various possible embodiments of the invention—

Figure 1 is a view in side elevation of a wagon with the check applied.

Fig. 2 is a development of the check.

Figure 3:
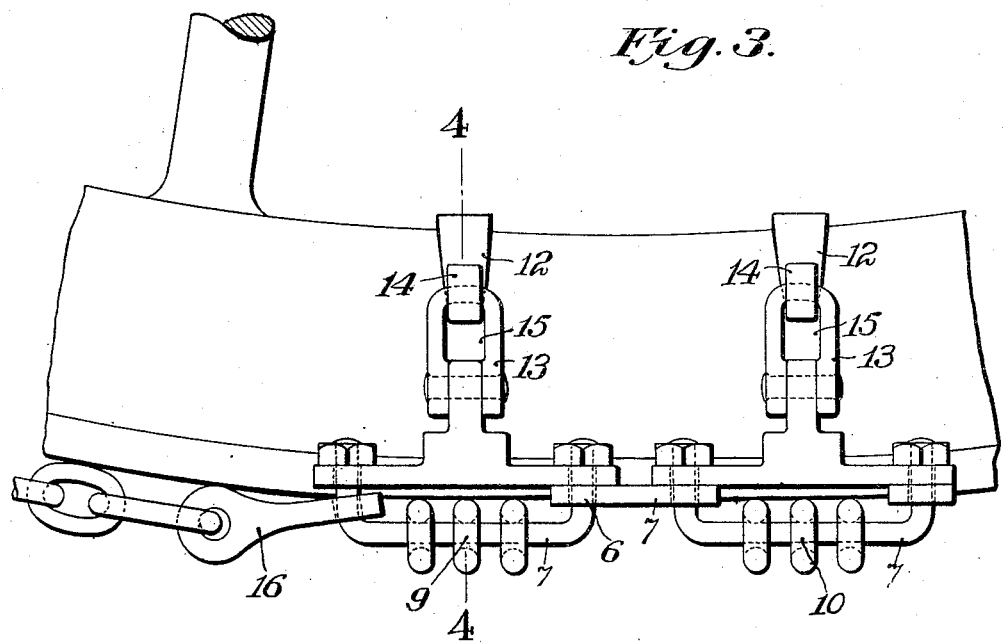
Fig. 3 shows the check in side view as in operation.
Figure 4:
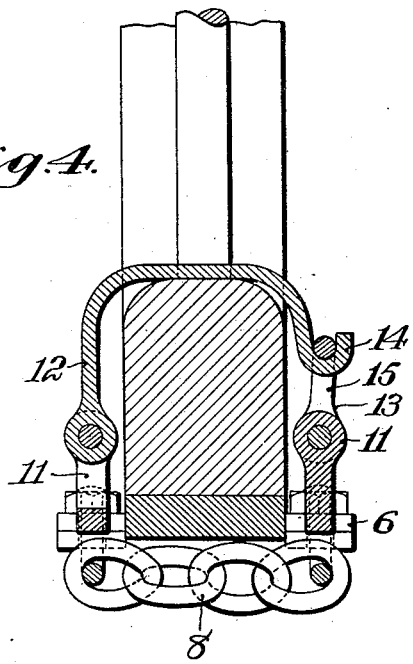
Fig. 4 is an end view of the check.

Referring now more particularly to the drawings wherein similar reference characters refer to similar parts throughout the several views there is indicated at 1 in schematic form a wagon having front and rear wheels 2 and 3 respectively. The wagon body is represented at 4 and is equipped with an eye-bolt or other suitable fastening device 5. The check or clog proper comprises a frame 6 made up of a plurality of links 7 and which provides a support for a tread 8. In this embodiment of the invention the tread is composed of two sets 9 and 10 of three cross chains each. Certain of the frame links are formed with bearing lugs 11 wherein are pivotally supported the complementary clasp members 12 and 13. The member 12 is long and of bail shape with a hook 14 at its free end. The member 13 is comparatively short with an opening 15 to receive the hook 14. Suitable freedom is permitted at the link joints of the frame to allow the device to conform to the curvature of the wheel when being applied and provide a general flexibility which facilitates attaching and detaching the same. It will be seen that there are two clasps similar to that just described, one associated with each tread set.

The forward end of the tread support is provided with a lug 16 which is suitably apertured or hooked to serve as a coupling or connector adapted to receive one end of a chain 17, the other end of which may be permanently connected to the wagon body at 5.

The device is intended for use principally on slippery inclines where great difficulty is experienced in manipulating heavily laden vehicles. Under such conditions the operator applies the check to the rim of a rear wheel at a point somewhat forward of the point of tangency of the wheel and ground. He then brings together both sets of clasp members over the wheel felly, the device being designed sufficiently oversize to permit the hooks 14 to engage the opening or eyes 15 and hold to the wheel until it reaches a position substantially as shown in the drawings (Fig. 1). To prevent movement beyond this position is a function of the chain 17 which the operator connects to the lug 16 after the clasps are in place. It will be readily seen that a short forward movement of the vehicle will straighten the chain and bring the tread sets in desired position. As the vehicle progresses the turning tendency of the rear wheels increases the pull on the chain 17 and acts to straighten the links of the tread frame and cause the clasps to grip the felly of the wheel so that the device will not slip thereon.

The chain treads distribute the wear and provides an engagement with the ground which is yielding in character and sufficiently uneven.

As many changes could be made in the above construction and many apparently widely different embodiments of the invention might be made without departing from the scope thereof, it is intended that all matter contained in the foregoing description or shown in the accompanying drawings shall be interpreted as illustrative and not in a limiting sense.

Having described my invention what I claim as new and desire to secure by Letters Patent is:

1. In a device of the character described, in combination, a tread supporting frame comprising opposite sides of longitudinally extending links connected together, the said sides being connected by a cross link at the forward end of the frame and by transverse cross chains at intervals, the connected longitudinal links being capable of relative movement to permit the frame to flex substantially to the curvature of a wheel, and means whereby said frame may be attached to the felly of a wheel.

2. A vehicle drag comprising a frame having a plurality of rows of connected longitudinally extending links loosely associated to permit the frame to conform to the curvature of a wheel, a cross link connecting the rows at their forward ends, transverse cross chains extending between the rows at intervals, and means for attaching the frame to the felly of a wheel.

3. In a vehicle drag in combination, a supporting frame composed of a multiplicity of loosely connected links forming two spaced longitudinal sides and a forward end, cross chains each comprising a plurality of links extending between the longitudinal sides, and means for securing the frame to the felly of a wheel.

4. In a device of the character described, supporting means for a tread, a tread comprising two sets of cross chains the sets being spaced apart, a pair of fasteners pivotally mounted relatively to said supporting means to render the device quick-detachable and means adapted to secure said tread to a point on the vehicle.

5. In a device of the character described, supporting means for a tread, a tread comprising two sets of cross chains the sets being spaced apart, a pair of fasteners pivotally mounted relatively to said supporting means to render the device quick-detachable and means adapted to secure said tread to a point on the vehicle, said means comprising a lug forwardly of the cross chains.

Signed at Boston, in the county of Suffolk and State of Massachusetts, this 8th day of February, A. D. 1917.

CHARLES A. MacLELLAN.

Copies of this patent may be obtained for five cents each, by addressing the "Commissioner of Patents, Washington, D. C."